United States Patent
Velusamy et al.

(10) Patent No.: US 11,006,248 B1
(45) Date of Patent: May 11, 2021

(54) QUALITY-OF-SERVICE MONITORING FOR A FIFTH GENERATION NEW RADIO (5GNR) ACCESS NODE AND A NON-5GNR ACCESS NODE

(71) Applicant: T-MOBILE INNOVATIONS LLC, Overland Park, KS (US)

(72) Inventors: Saravana Velusamy, Overland Park, KS (US); Mohammed Samiuddin, Overland Park, KS (US); Sreekar Marupaduga, Overland Park, KS (US); Sougata Saha, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/502,926

(22) Filed: Jul. 3, 2019

(51) Int. Cl.
| | |
|---|---|
| *H04W 4/12* | (2009.01) |
| *H04W 28/16* | (2009.01) |
| *H04W 8/08* | (2009.01) |
| *H04W 76/12* | (2018.01) |
| *H04W 36/00* | (2009.01) |

(52) U.S. Cl.
CPC .............. *H04W 4/12* (2013.01); *H04W 8/08* (2013.01); *H04W 28/16* (2013.01); *H04W 36/0044* (2013.01); *H04W 76/12* (2018.02)

(58) Field of Classification Search
None
See application file for complete search history.

(56) References Cited

U.S. PATENT DOCUMENTS

| | | | | |
|---|---|---|---|---|
| 2016/0278097 | A1* | 9/2016 | Ueda .................. | H04W 72/0486 |
| 2019/0124572 | A1* | 4/2019 | Park .................. | H04W 72/0446 |
| 2019/0215731 | A1* | 7/2019 | Qiao .................... | H04W 60/00 |
| 2019/0268815 | A1* | 8/2019 | Zhu ........................ | H04W 76/12 |
| 2020/0120551 | A1* | 4/2020 | Mukherjee .......... | H04L 65/1069 |
| 2020/0178136 | A1* | 6/2020 | Xu ........................ | H04W 76/12 |
| 2020/0196198 | A1* | 6/2020 | Hoffner .................. | H04W 4/90 |
| 2020/0213912 | A1* | 7/2020 | Shi ........................ | H04W 36/12 |
| 2020/0245388 | A1* | 7/2020 | Byun .................... | H04W 76/27 |

FOREIGN PATENT DOCUMENTS

WO      2016051236 A1      4/2016

\* cited by examiner

*Primary Examiner* — Saumit Shah

(57) ABSTRACT

A wireless communication system serves UEs over a 5GNR access point and a non-5GNR access point. The wireless base station transfers an attachment message for a UE to a network controller. The network controller transfers network signaling for the UE to the data network element responsive to the attachment message. The data network element transfers user data for the UE. The wireless base station transfers another attachment message that indicates a 5GNR attachment for another UE to the network controller. The network controller transfers other network signaling indicating the 5GNR attachment for the other UE to the data network element responsive to the other attachment message indicating the 5GNR attachment. The data network element transfers other user data for the other UE and monitors quality-of-service for the transfer of the other user data responsive to the 5GNR attachment indication in the other network signaling.

18 Claims, 8 Drawing Sheets

US 11,006,248 B1

QUALITY-OF-SERVICE MONITORING FOR A FIFTH GENERATION NEW RADIO (5GNR) ACCESS NODE AND A NON-5GNR ACCESS NODE

TECHNICAL BACKGROUND

Wireless communication networks provide wireless data services to wireless user devices. Exemplary wireless data services include voice-calling, internet-access, and machine communications. Exemplary wireless user devices comprise phones, computers, drones, and robots. The wireless communication networks have wireless access nodes that exchange wireless signals with the wireless user devices. The wireless signals transport user data and network signaling. The wireless access nodes exchange the user data and network signaling with other network elements to help deliver the wireless data services. Exemplary wireless communication networks include Fifth Generation New Radio (5GNR) networks and Long Term Evolution (LTE) networks.

Some wireless user devices have both LTE radios and 5GNR radios. These dual 5GNR/LTE user devices can wirelessly communicate with both 5GNR access nodes and LTE access nodes at the same time. Thus, hybrid 5GNR/LTE networks transfer user data to 5GNR/LTE user devices over dual 5GNR/LTE links using both 5GNR access nodes and LTE access nodes. The bearer setup and modification for exchanging user data between the data network elements (e.g., a Serving Gateway (S-GW) or User Plane Function (UPF)) over a network controller (e.g., a Mobility Management Entity (MME) or Access and Mobility Management Function (AMF)) remains fairly simple and rigid for the 5GNR access node and the LTE access node. Unfortunately, MME/AMF and S-GW/UPF do not efficiently and effectively determine whether the 5GNR/LTE user devices attached to the hybrid 5GNR/LTE network using the 5GNR access point or the LTE access point. Moreover, the MME/AMF and S-GW/UPF do not intelligently determine whether a poor quality-of-service for a 5GNR/LTE user device is caused by the 5GNR access point or the LTE access point.

Technical Overview

A wireless communication system serves UEs over a 5GNR access point and a non-5GNR access point. The wireless base station transfers an attachment message for a UE to a network controller responsive to the UE wirelessly attaching to the non-5GNR access point. The network controller transfers network signaling for the UE to the data network element responsive to the attachment message. The data network element transfers user data for the UE responsive to the network signaling. The wireless base station transfers another attachment message that indicates a 5GNR attachment for another UE to the network controller responsive to the other UE wirelessly attaching to 5GNR access point. The network controller transfers other network signaling indicating the 5GNR attachment for the other UE to the data network element responsive to the other attachment message indicating the 5GNR attachment. The data network element transfers other user data for the other UE responsive to the other network signaling and monitors quality-of-service for the transfer of the other user data responsive to the 5GNR attachment indication in the other network signaling.

DETAILED DESCRIPTION

Figure 1:
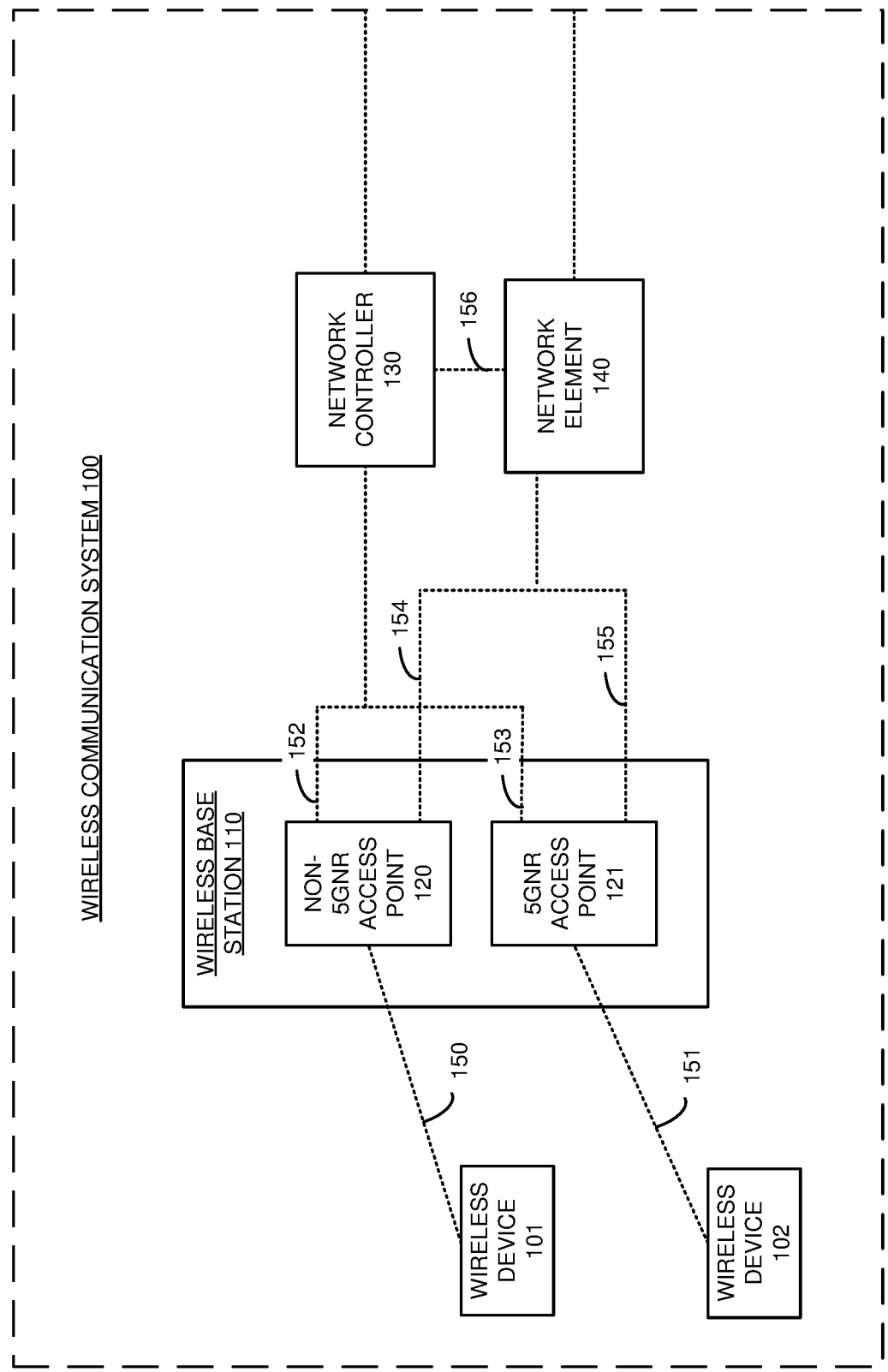
FIG. 1 illustrates a wireless communication system to serve User Equipment (UE) over a Fifth Generation New Radio (5GNR) access point and a non-5GNR access point.

FIG. 1 illustrates wireless communication system to serve User Equipment (UE) over a Fifth Generation New Radio (5GNR) access point and a non-5GNR access point. Wireless communication system 100 comprises User Equipment (UE) 101, UE 102, wireless base station 110, network controller 130, and data network element 140. Wireless base station 110 comprises non-5GNR access point 120 and 5GNR access point 121. Wireless communication network 100 serves UE 101 with data services like media-conferencing, social-networking, media-streaming, machine communications, and internet access.

UE 101 is coupled to non-5GNR access point 120 over non-5GNR link 150. UE 102 is coupled to 5GNR access point 121 over 5GNR link 151. Network controller 130 is coupled to non-5GNR access point 120 over non-5GNR link 152. Network controller 130 is coupled to 5GNR access point 121 over link 153. Network element 140 is coupled to non-5GNR access point 120 over link 154. Network element 140 is coupled to 5GNR access point 121 over link 155. Network controller 130 is coupled to data network element 140 over data link 156.

UE 101 and UE 102 may each transfer communications to network controller 130 from wireless base station 110. UE 101 and UE 102 could each be a computer, phone, vehicle, sensor, robot, display, headset, or some other user apparatus that uses Long Term Evolution (LTE), Fifth Generation New Radio (5GNR), Institute of Electrical and Electronic Engineers 802.11 (WIFI), or some other wireless network protocol. UE 101 and UE 102 each comprise radio circuitry and baseband circuitry. The radio circuitry comprises antennas, modulators, amplifiers, filters, digital/analog interfaces, processing circuitry, memory circuitry, firmware/software, and bus circuitry. The baseband circuitry comprises processing circuitry, memory circuitry, bus circuitry, and software. In the baseband circuitry, the processing circuitry executes operating systems, user applications, and network applications that are stored in the memory circuitry.

Non-5GNR access point 120 could be a Long Term Evolution (LTE) eNodeB, a WIFI hotspot, and the like. 5GNR access point 121 could be 5GNR gNodeB. Access points 120-121 each comprise transceiver circuitry and processing circuitry. The transceiver circuitry comprises antennas, modulators, amplifiers, filters, digital/analog interfaces, microprocessors, memory, and bus connections. The processing circuitry comprises microprocessors, memory, user interfaces, and bus connections. In access points 120-121, the microprocessors comprise Digital Signal Processors (DSPs), Central Processing Units (CPUs), Graphical Processing Units (GPUs), Field Programmable Gate Arrays (FPGAs), Application-Specific Integrated Circuits (ASICs), and/or the like. The memories comprise Random Access Memory (RAM), flash circuitry, disc drives, and/or the like. The memories store operating systems and network applications. The microprocessors execute the operating systems and network applications to wirelessly exchange user data with UE 101 over link 150 and with UE 102 over link 151 and to exchange the user data with network controller 130 over links 152-153. Exemplary network applications comprise Physical Layer (PHY), Media Access Control (MAC), Radio Link Control (RLC), Packet Data Convergence Protocol (PDCP), Radio Resource Control (RRC), and Service Data Adaptation Protocol (SDAP).

Network controller 130 could be in an LTE core, 5G core, and/or some other type of network data center. Network controller 130 may comprises LTE and 5G network controllers, such as a Mobility Management Entity (MME) and or an Access and Mobility Management Function (AMFs). Network controller 130 comprises processing circuitry, memory circuitry, bus circuitry, transceivers and software. The processing circuitry executes operating systems and the network control software that are stored in the memory circuitry.

Data network element 140 could be in an LTE core, 5G core, and/or some other type of data center. Data network element 140 may comprise LTE and 5G data network elements, such as a Serving Gateway (S-GW), Packet Data Network Gateway (P-GW), Policy Control Rules Function (PCRF), Home Subscriber System (HSS), Authentication Server Function (AUSF), Unified Data Management (UDM), Session Management Function (SMF), User Plane Function (UPF), Policy Control Functions (PCF), Application Functions (AF), Network Repository Function (NRF), Network Slice Selection Function (NSSF), Network Exposure Function (NEF), and typically other network functions. Data network element 140 comprises processing circuitry, memory circuitry, bus circuitry, transceivers and software. The processing circuitry executes operating systems and data network element software that are stored in the memory circuitry.

In operation, wireless base station 110 transfers an attachment message for UE 101 to network controller 130 responsive to UE 101 wirelessly attaching to non-5GNR access point 120. The attachment message for UE 101 may include registration information, such as an International Mobile Subscriber Identifier (IMSI), International Mobile Equipment Identifier (IMEI), Internet Protocol Multimedia Public Identity (IMIT), Internet Protocol Multimedia Private Identity (IMPI), or some other user identification code. Wireless base station 110 may transfer the attachment message including the registration information to network controller 130 over link 150. In some examples, non-5GNR access point 120 may comprise an LTE eNodeB. In this example, the network controller may be an MME which communicates with LTE eNodeB over an S1-MME signaling link.

In some examples, wireless base station 110 may transfer the attachment message for UE 101 to network controller 130 by transferring a node type parameter over at least one of an S1-MME signaling link and an N2 signaling link to network controller 130 responsive to the UE attachment to non-5GNR access point 120. In other examples, wireless base station 110 may transfer the attachment message for UE 101 to network controller 130 by transferring a node type parameter in an Evolved Packet Switched System (EPS) Radio Access Bearer (E-RAB) Modification Indication to network controller 130 responsive to the UE attachment to non-5GNR access point 120.

Network controller 130 transfers network signaling for UE 101 to data network element 140 responsive to the attachment message. In some examples, network controller 130 transfers the network signaling for UE 101 to data network element 140 by transferring a node type parameter in a modify bearer request message to data network 140 element responsive to the attachment message. Data network element 140 then transfers user data for UE 101 responsive to the network signaling.

Wireless base station 110 transfers another attachment message that indicates a 5GNR attachment for UE 102 to network controller 130 responsive to UE 102 wirelessly attaching to 5GNR access point 121. In some examples, wireless base station 110 may transfer the attachment message for UE 102 to network controller 130 by transferring a node type parameter over an S1-MME signaling link or an N2 signaling link to network controller 130 responsive to the UE attachment to 5GNR access point 121. In other examples, wireless base station 110 may transfer the attachment message for UE 102 to network controller 130 by transferring a node type parameter in an E-RAB Modification Indication to network controller 130 responsive to the UE attachment to 5GNR access point 121.

Network controller 130 transfers other network signaling indicating the 5GNR attachment for UE 102 to data network element 140 responsive to the other attachment message indicating the 5GNR attachment. In some examples, network controller 130 transfers the network signaling for UE 102 to data network element 140 by transferring a node type parameter in a modify bearer request message to data network 140 element responsive to the attachment message.

Data network element 140 transfers other user data for UE 102 responsive to the other network signaling and monitors quality-of-service for the transfer of the other user data responsive to the 5GNR attachment indication in the other network signaling. In some examples, data network element 140 may also determine that the quality-of service for UE 102 exceeds a bearer switch threshold and in response, transfers an instruction to wireless base station 110 to handover UE 102 from 5GNR access point 121 to non-5GNR access point 120.

In other examples, data network element 140 may monitor the quality-of-service for the transfer of the other user data responsive to the 5GNR attachment indication in the other network signaling by performing a periodic General Packet Radio Service (GPRS) Tunneling Protocol User Plane (GTPU) Echo test to determine the transfer of the other user data responsive to the 5GNR attachment indication in the other network signaling.

Advantageously, wireless communication system 100 enhances a user's experience when encountering quality-of-service issues when using either 5GNR access point 121 or non-5GNR access point 120. Another technical effect which may be appreciated from the present disclosure is the ability for network controllers (e.g., MMEs and AMFs) and data network elements (e.g., S-GWs and UPFs) to track the number of devices that are connected to each of the non-5GNR access points and the 5GNR access points, and determine how long the devices are able to stay connected and help identify areas to optimize as a result.

Figure 2:
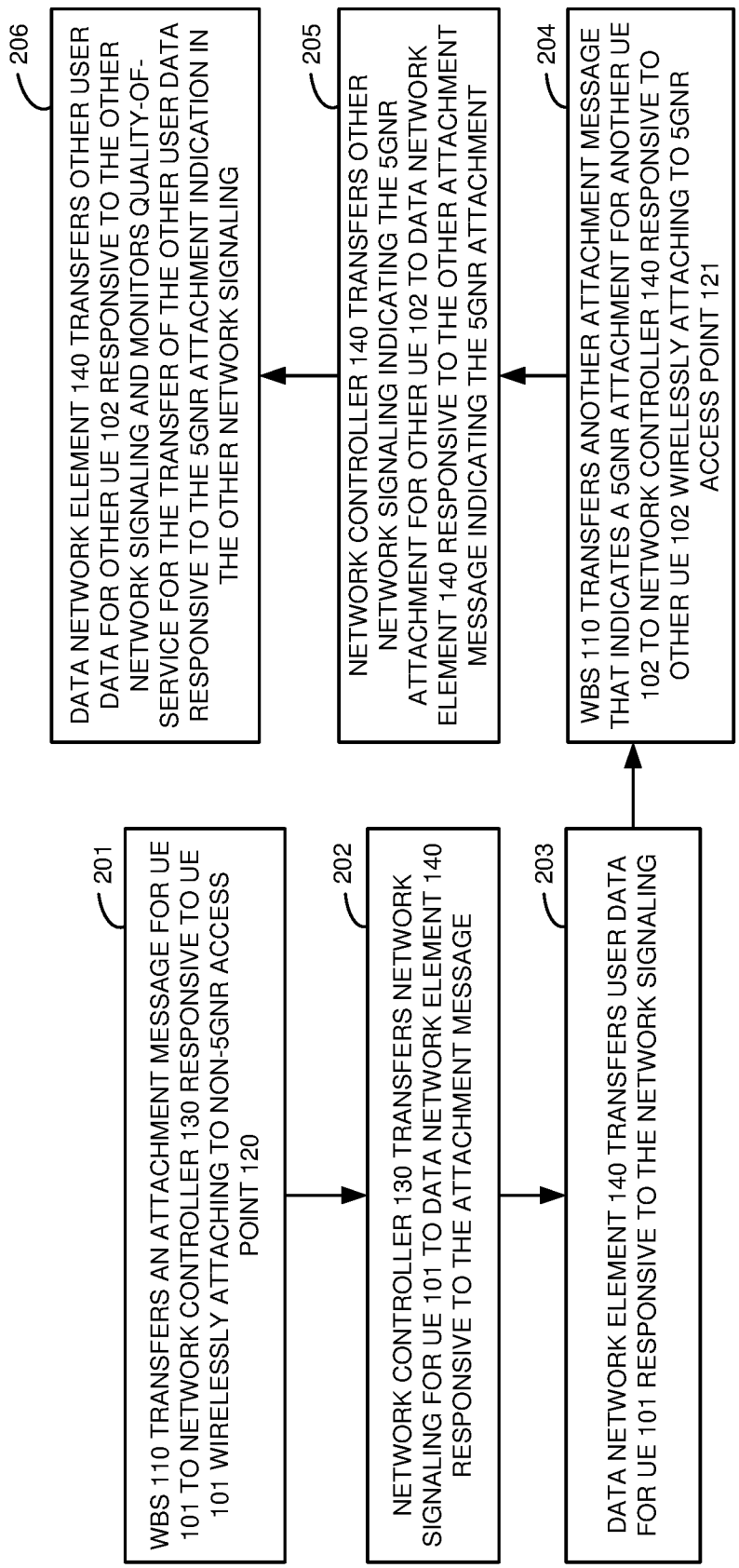
FIG. 2 illustrates an operation of the wireless communication system to serve UEs over a 5GNR access point and a non-5GNR access point.

FIG. 2 illustrates the operation of a wireless communication system to serve UEs over a 5GNR access point and a non-5GNR access point. In a first operation, wireless base station 110 transfers an attachment message for UE 101 to network controller 130 responsive to UE 101 wirelessly attaching to non-5GNR access point 120 (201). Network controller 130 transfers network signaling for UE 101 to data network element 140 responsive to the attachment message (202). Data network element 140 transfers user data for UE 101 responsive to the network signaling (203). Wireless base station 110 transfers another attachment message that indicates a 5GNR attachment for UE 102 to network controller 130 responsive to UE 102 wirelessly attaching to 5GNR access point 121 (204). Network controller 130 transfers other network signaling indicating the 5GNR attachment for UE 102 to data network element 140 responsive to the other attachment message indicating the 5GNR attachment (205). Data network element 140 transfers other user data for UE 102 responsive to the other network signaling and monitors quality-of-service for the transfer of the other user data responsive to the 5GNR attachment indication in the other network signaling (206).

Figure 3:
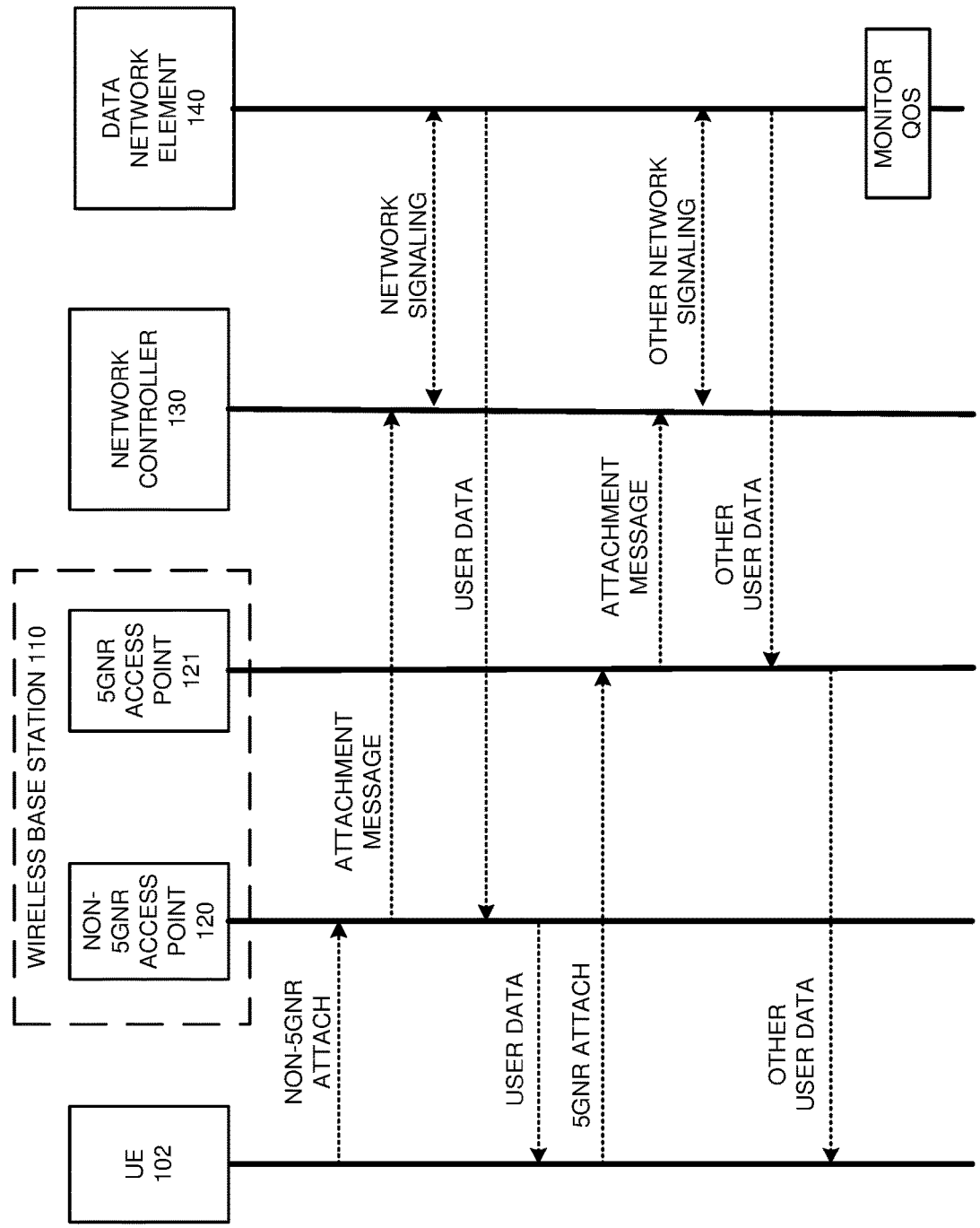
FIG. 3 illustrates an operation of the wireless communication system to serve UEs over a 5GNR access point and a non-5GNR access point.

FIG. 3 illustrates an operation of the wireless communication system to serve UEs over a 5GNR access point and a non-5GNR access point. UE 102 wirelessly attaches to non-5GNR access point 120 in wireless base station 110. Wireless base station 110 transfers an attachment message for UE 102 to network controller 130 responsive to UE 102 wirelessly attaching to non-5GNR access point 120. Network controller 130 transfers network signaling for UE 102 to data network element 140 responsive to the attachment message. Data network element 140 transfers user data for UE 102 to wireless base station 110 responsive to the network signaling. Wireless base station 110 then exchanges user data with UE 102.

In a next operation, UE 102 wirelessly attaches to 5GNR access point 121 in wireless base station 110. Wireless base station 110 transfers another attachment message that indicates a 5GNR attachment for UE 102 to network controller 130 responsive to UE 102 wirelessly attaching to 5GNR access point 121. Network controller 130 transfers other network signaling indicating the 5GNR attachment for UE 102 to data network element 140 responsive to the other attachment message indicating the 5GNR attachment. Data network element 140 transfers other user data for UE 102 with wireless base station 110 responsive to the other network signaling. Wireless base station 110 then exchanges the other user data with UE 102. Data network element 140 also monitors quality-of-service for the transfer of the other user data responsive to the 5GNR attachment indication in the other network signaling.

Figure 4:
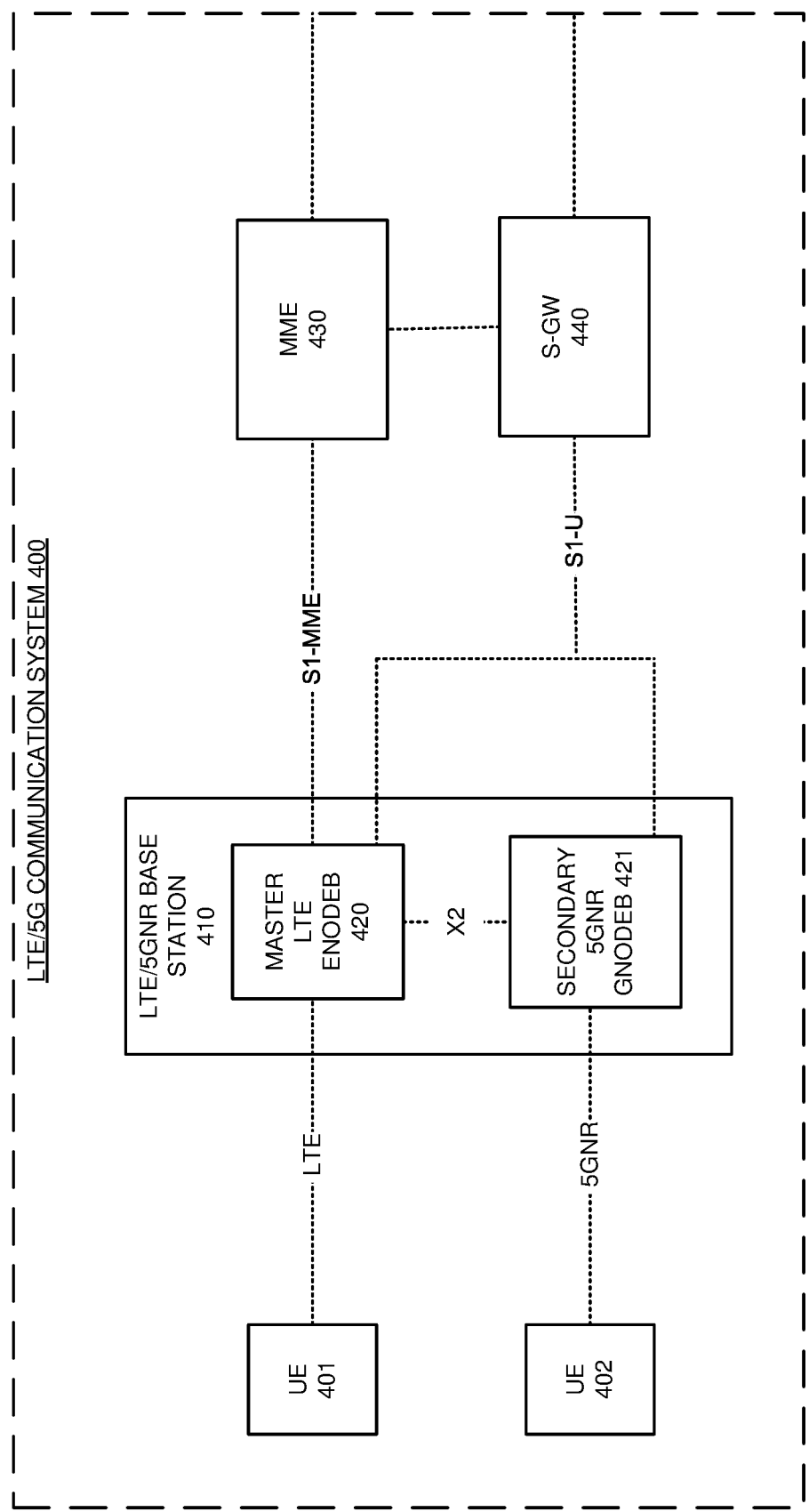
FIG. 4 illustrates a 5GNR/Long Term Evolution (LTE) network to serve a 5GNR/LTE UE over a master LTE eNodeB and a secondary 5GNR gNodeB.

FIG. 4 illustrates 5GNR/LTE network 400 to serve a 5GNR/LTE UE over a master LTE eNodeB and a secondary 5GNR gNodeB. LTE/5G communication system 400 is an example of wireless communication system 100, although system 100 may differ. LTE/5G communication system 400 comprises LTE/5GNR UE 401, LTE/5GNR UE 402, LTE/5GNR base station 410, MME 430, and S-GW 440. LTE/5GNR base station 410 comprises master LTE eNodeB 420 and secondary 5GNR gNodeB 421.

LTE/5GNR UE 401 is coupled to master LTE eNodeB 420 over an LTE link.

LTE/5GNR UE 402 is coupled to secondary 5GNR gNodeB 421 over a 5GNR link. Master LTE eNodeB 420 and secondary 5GNR gNodeB 421 are coupled by X2 links. Master LTE eNodeB 420 and MME 430 are coupled over S1-MME links. Master LTE eNodeB 420 and S-GW 440 are coupled over S1-U links. Secondary 5GNR gNodeB 421 and S-GW 440 are also coupled over S1-U links. MME 430 and S-GW 440 are couple to one another and to other network elements which are omitted for clarity.

In this example, LTE/5GNR UE 401 wirelessly attaches to master LTE eNodeB 420 in LTE/5GNR base station 410 over the LTE link. LTE/5GNR base station 410 transfers an attachment message for LTE/5GNR UE 401 to MME 430 over the S1-MME link responsive to LTE/5GNR UE 401 wirelessly attaching to master LTE eNodeB 420. MME 430 transfers network signaling for LTE/5GNR UE 401 to S-GW 440 responsive to the attachment message. S-GW 440 transfers user data for LTE/5GNR UE 401 to master LTE eNodeB 420 in LTE/5GNR base station 410 over the S1-U link responsive to the network signaling. Master LTE eNodeB 420 then exchanges user data with LTE/5GNR UE 401.

Next, LTE/5GNR UE 402 wirelessly attaches to secondary 5GNR gNodeB 421 in LTE/5GNR base station 410 over the 5GNR link. LTE/5GNR base station 410 transfers another attachment message that indicates a 5GNR attachment for LTE/5GNR UE 402 to MME 430 over the S1-MME link responsive to LTE/5GNR UE 402 wirelessly attaching to secondary 5GNR gNodeB 421. MME 430 may then transfer other network signaling indicating the 5GNR attachment for LTE/5GNR UE 402 to S-GW 440 responsive to the other attachment message indicating the 5GNR attachment.

S-GW 440 transfers other user data for LTE/5GNR UE 402 with secondary 5GNR gNodeB 421 in LTE/5GNR base station 410 over the S1-U link responsive to the other network signaling. Secondary 5GNR gNodeB 421 then exchanges the other user data with LTE/5GNR UE 402 over the 5GNR link. S-GW 440 also performs a periodic GTPU Echo test to monitor the quality-of-service for the transfer of the other user data responsive to the 5GNR attachment indication in the other network signaling.

Figure 5:
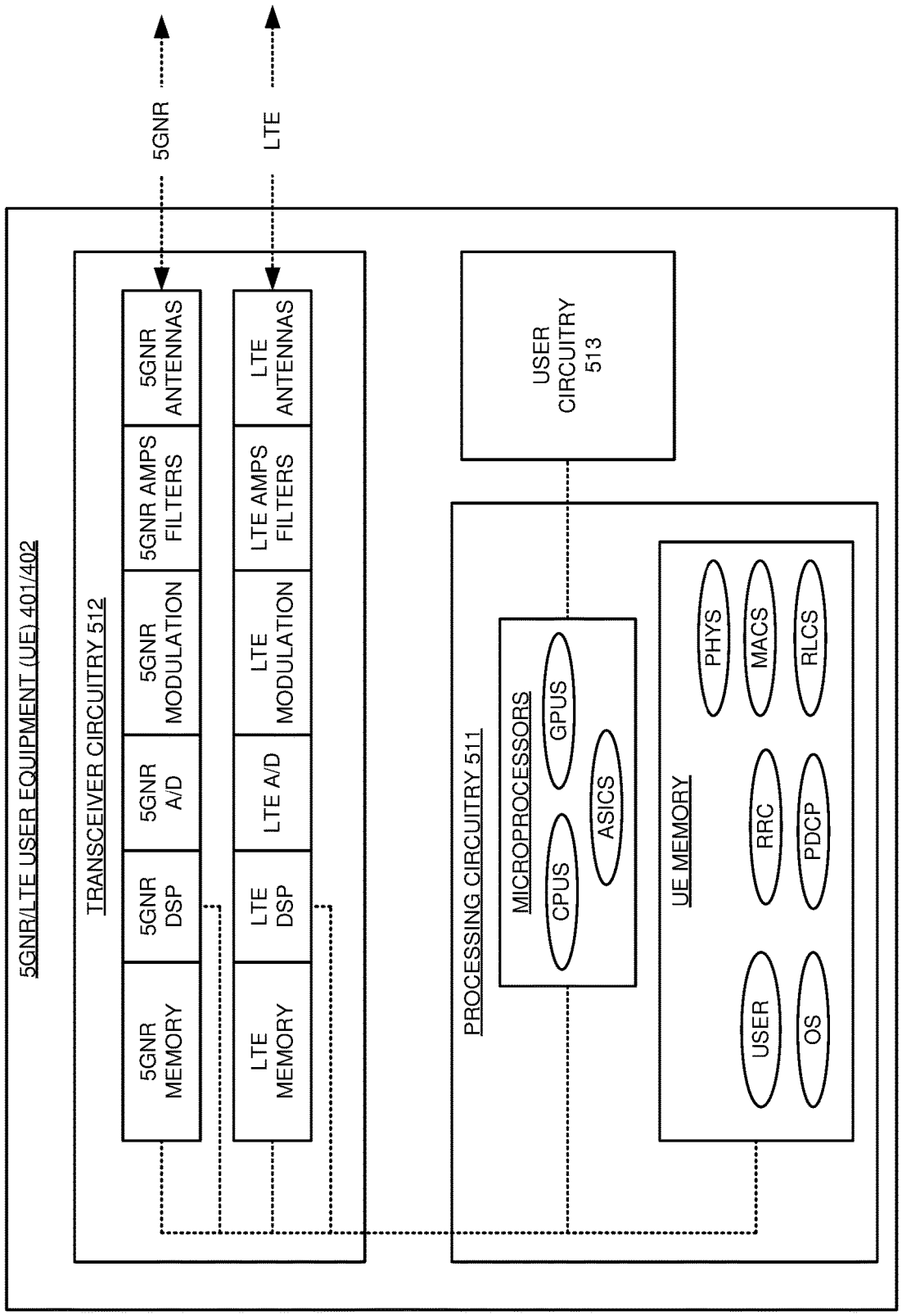
FIG. 5 illustrates the 5GNR/LTE UE that is served by the master LTE eNodeB and the secondary 5GNR gNodeB.

FIG. 5 illustrates an LTE/5GNR UE 401 and LTE/5GNR UE 402 that are served by master LTE eNodeB 420 or secondary 5GNR gNodeB 421. LTE/5GNR UE 401 and LTE/5GNR UE 402 are examples of UE 101 and UE 102, although UE 101 and UE 102 may differ. 5GNR/LTE UE 401 and LTE/5GNR UE 402 each comprise processing circuitry 511, transceiver circuitry 512, and user circuitry 513 which are interconnected over bus circuitry. User circuitry 513 comprises graphic displays, machine controllers, sensors, cameras, transceivers, and/or some other user interface components. Transceiver circuitry 512 comprises radios for 5GNR, LTE, and WIFI. The radios each comprise antennas, amplifiers (AMPS), filters, modulation, analog/digital interfaces (A/D), Digital Signal Processors (DSP), and memory. The radios may share some of these components by using time diversity, frequency separation, and the like.

Processing circuitry 511 comprises microprocessors and UE memory. The microprocessors comprise CPUs, GPUs, ASICs, and/or some other computer circuitry. The UE memory comprises volatile and non-volatile data storage like RAM, flash, and/or disk. The UE memory stores an operating system (OS), user applications, and network applications for 5GNR and LTE. The network applications comprise Physical Layer (PHY), Media Access Control (MAC), Radio Link Control (RLC), Packet Data Convergence Protocol (PDCP), and Radio Resource Control (RRC). The microprocessors execute the operating system, user applications, and network applications to exchange user data and network signaling with secondary 5GNR gNodeB 421 over the 5GNR link and with master LTE eNodeB 420 over the LTE link.

The user applications store Uplink (UL) user data and signaling in the UE memory. The network applications process the UL user data/signaling and Downlink (DL) network signaling to generate UL network signaling. The network applications transfer the UL user data and network signaling to the 5GNR and LTE memories in transceiver circuitry 512. In transceiver circuitry 512, the DSPs process the UL user data and network signaling to transfer corresponding digital UL signals to the A/D interfaces. The A/D interfaces convert the digital UL signals into analog UL signals for modulation. Modulation up-converts the analog UL signals to their carrier frequencies. The amplifiers boost the modulated UL signals for the filters which attenuate unwanted out-of-band energy. The filters transfer the UL signals through duplexers to the antennas. The electrical UL signals drive the antennas to emit corresponding wireless UL signals that transport the UL user data and network signaling to the wireless access nodes.

In the transceiver circuitry 512, the antennas receive wireless DL signals that transport user data and network signaling from the wireless access nodes. The antennas transfer corresponding electrical DL signals through duplexers to the amplifiers. The amplifiers boost the received DL signals for filters which attenuate unwanted energy. In modulation, demodulators down-convert the DL signals from their carrier frequencies. The A/D interfaces convert the analog DL signals into digital DL signals for the DSPs. The DSPs recover DL data from the digital DL signals. The DSPs transfer the DL data to the UE memory. The microprocessors execute the network applications to process the DL data to recover the DL application data and network signaling. The microprocessors execute the network applications to store the DL user data and signaling in the UE memory. The user applications process their user data and signaling in the UE memory.

In processing circuitry 511, the 5GNR RRC maps between network signaling and SDUs. The LTE RRC maps between user data/network signaling and SDUs. The LTE/5GNR RRCs exchange their SDUs with the 5GNR PDCP and the LTE PDCP. The PDCPs map between the SDUs and Protocol Data Units (PDUs). The 5GNR/LTE PDCPs exchange the PDUs with the 5GNR RLC and LTE RLC. The RLCs map between the PDUs and MAC logical channels. The RLCs exchanges the application data and network signaling with the MACs over the MAC logical channels. The MACs map between the MAC logical channels and MAC transport channels. The MAC exchanges the application data and network signaling with the PHYs over the MAC transport channels. The PHYs map between the MAC transport channels and PHY transport channels. The PHYs exchange the application data and network signaling with PHYs in the wireless access nodes over the PHY transport channels.

RRC functions comprise authentication, security, handover control, status reporting, Quality-of-Service (QoS), network broadcasts and pages, and network selection. PDCP functions comprise security ciphering, header compression and decompression, sequence numbering and re-sequencing, de-duplication. RLC functions comprise Automatic Repeat Request (ARQ), sequence numbering and resequencing, segmentation and re-segmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

Figure 6:
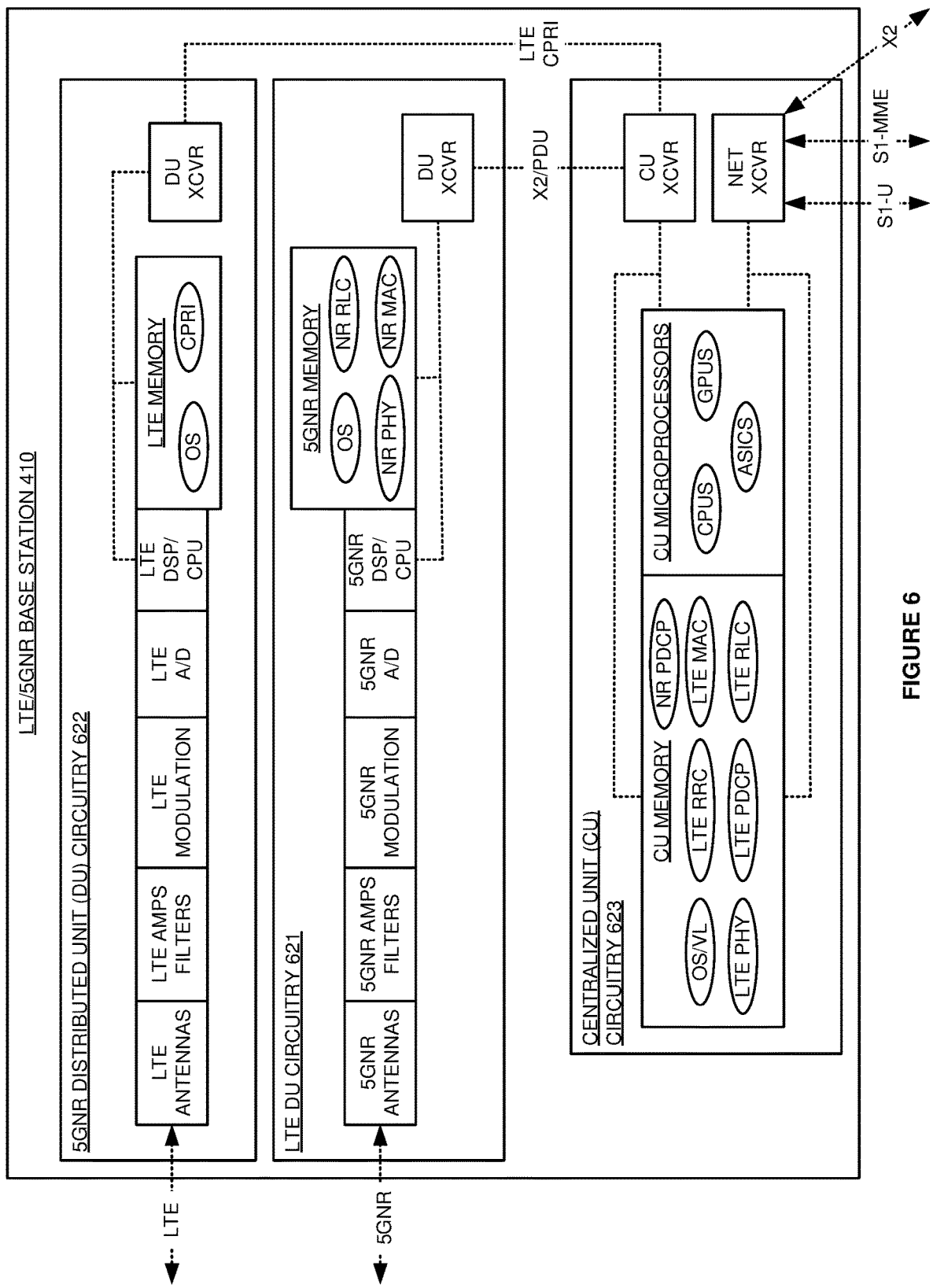
FIG. 6 illustrates the master LTE eNodeB and the secondary 5GNR gNodeB that serve the 5GNR/LTE UE.

FIG. 6 illustrates LTE/5GNR base station 410 that serves 5GNR/LTE UE 401 and 5GNR/LTE UE 402. LTE/are represented by DE and CU. LTE/5GNR base station 410 comprises master LTE eNodeB 420 and secondary 5GNR gNodeB 421. NodeBs 420-421 comprise an example of access points 120-121, although points 120-121 may differ. Master LTE eNodeB 420 comprises LTE Distributed Unit (DU) circuitry 621 and Centralized Unit (CU) circuitry 623. Secondary 5GNR gNodeB 421 comprises 5GNR DU circuitry 622. DU circuitry 621-622 each comprise antennas, amplifiers/filters, modulation, A/D, DSP/CPU, memory, and DU transceivers (XCVR) that are coupled over bus circuitry. CU circuitry 622 comprises CU microprocessors, CU memory, CU transceivers, and network transceivers that are coupled over bus circuitry.

The antennas in LTE DU circuitry 621 are coupled to 5GNR/LTE UEs over wireless LTE links. The antennas in 5GNR circuitry 622 are coupled to the 5GNR/LTE UEs over wireless 5GNR links. The DU transceivers in LTE DU circuitry 621 are coupled to the CU transceivers in CU circuitry 623 over LTE Common Public Radio Interface (CPRI) links. The DU transceivers in 5GNR DU circuitry 622 are coupled to the CU transceivers in CU circuitry 623 over X2 links. The network transceivers in CU circuitry 622 are coupled to MMEs over 51-MME links. The network transceivers in CU circuitry 622 are coupled to S-GWs over 51-U links. The network transceivers in CU circuitry 622 are coupled to other wireless access nodes over X2 links.

In LTE DU circuitry 621, the LTE memory stores an operating system and network applications for CPRI. In 5GNR DU circuitry 622, the 5GNR memory stores an operating system and network applications for 5GNR PHY, MAC, and RLC. In CU circuitry 623, the CU memory stores an operating system, virtual layer (VIRTUAL LAYERS) components, and network applications. The virtual layer components comprise hypervisor modules, virtual switches, virtual machines, and/or the like. The network applications include LTE PHY, LTE MAC, LTE RLC, LTE PDCP, LTE RRC, and NR PDCP. In this example, 5GNR DU circuitry 622 hosts the network applications for NR PHY, NR MAC, and NR RLC while CU circuitry 622 hosts the network applications for NR PDCP, LTE PHY, LTE MAC, LTE RLC, LTE PDCP, and LTE RRC. In other examples, circuitry 621-623 may use other network application splits.

In DU circuitry 621-622, the antennas receive wireless UL signals from 5GNR/LTE UEs that transport user data and network signaling. The antennas transfer corresponding electrical UL signals through duplexers to the amplifiers. The amplifiers boost the received UL signals for filters which attenuate unwanted energy. In modulation, demodulators down-convert the UL signals from their carrier frequencies. The analog/digital interfaces convert the analog UL signals into digital UL signals for the DSPs. The DSPs recover UL symbols from the UL digital signals. In 5GNR DU circuitry 622, the 5GNR CPU executes the 5GNR PHY, MAC, and RLC to recover 5GNR PDUs from the UL symbols. The DU transceivers transfer the UL 5GNR PDUs to the CU transceivers in CU circuitry 622 over the X2 links or PDU links. In LTE CU circuitry 621, the LTE DSP/CPU executes the LTE CPRI to format the UL LTE symbols for transmission. The DU transceivers transfer the UL 5GNR PDUs and the UL LTE symbols to the CU transceivers in CU circuitry 622 over the CPRI, X2, and PDU links.

In centralized CU circuitry 623, the CU microprocessors execute the LTE PDCP and RRC to recover UL RRC data and RRC signaling from the UL 5GNR PDUs. The CU microprocessors execute the LTE PHY, LTE MAC, LTE RLC, LTE PDCP, and LTE RRC to recover UL RRC data and RRC signaling from the UL LTE PDUs. The CU microprocessors execute the LTE RRC to process UL/DL RRC data and RRC signaling to generate UL S1-U data, UL S1-MME signaling, DL RRC data, and DL RRC signaling. The network transceivers transfer the UL S1-U data to the LTE-SGWs over the S1-U links. The network transceivers transfer the S1-MME signaling to MMEs over the S1-MME links.

The network transceivers receive DL S1-MME signaling from the MMEs over the S1-MME links. The network transceivers receive DL S1-U data from the S-GWs over the S1-U links. The CU microprocessors execute the LTE RRC to process the DL S1-MME signaling to generate DL RRC signaling and UL S1-MME signaling. The CU microprocessors execute the LTE RRC, PDCP, RLC, MAC, PHY to process the DL S1-U data to generate DL LTE symbols. The CU microprocessors execute the 5GNR PDCP to process the DL S1-U data to generate DL 5GNR PDUs. The CU transceivers transfer the DL LTE symbols to LTE DU circuitry 621. The CU transceivers transfer the DL 5GNR PDUs to 5GNR DU circuitry 622.

In LTE DU circuitry 621, the LTE CPU executes the LTE DSP to process the DL LTE symbols and generate corresponding digital DL signals for the LTE A/D. In 5GNR DU circuitry 622, the 5GNR CPU executes the 5GNR RLC, MAC, and PHY to process the DL PDUs to generate DL 5GNR symbols. The 5GNR DSP process the DL symbols to generate corresponding digital DL signals for the 5GNR A/D. In DU circuitry 621-622, the A/Ds convert the digital DL signals into analog DL signals for modulation. Modulation up-converts the DL signals to their carrier frequencies. The amplifiers boost the modulated DL signals for the filters which attenuate unwanted out-of-band energy. The filters transfer the DL signals through duplexers to the antennas. The electrical DL signals drive the antennas to emit corresponding wireless DL signals that transport the DL data and signaling to the 5GNR/LTE UEs.

Figure 7:
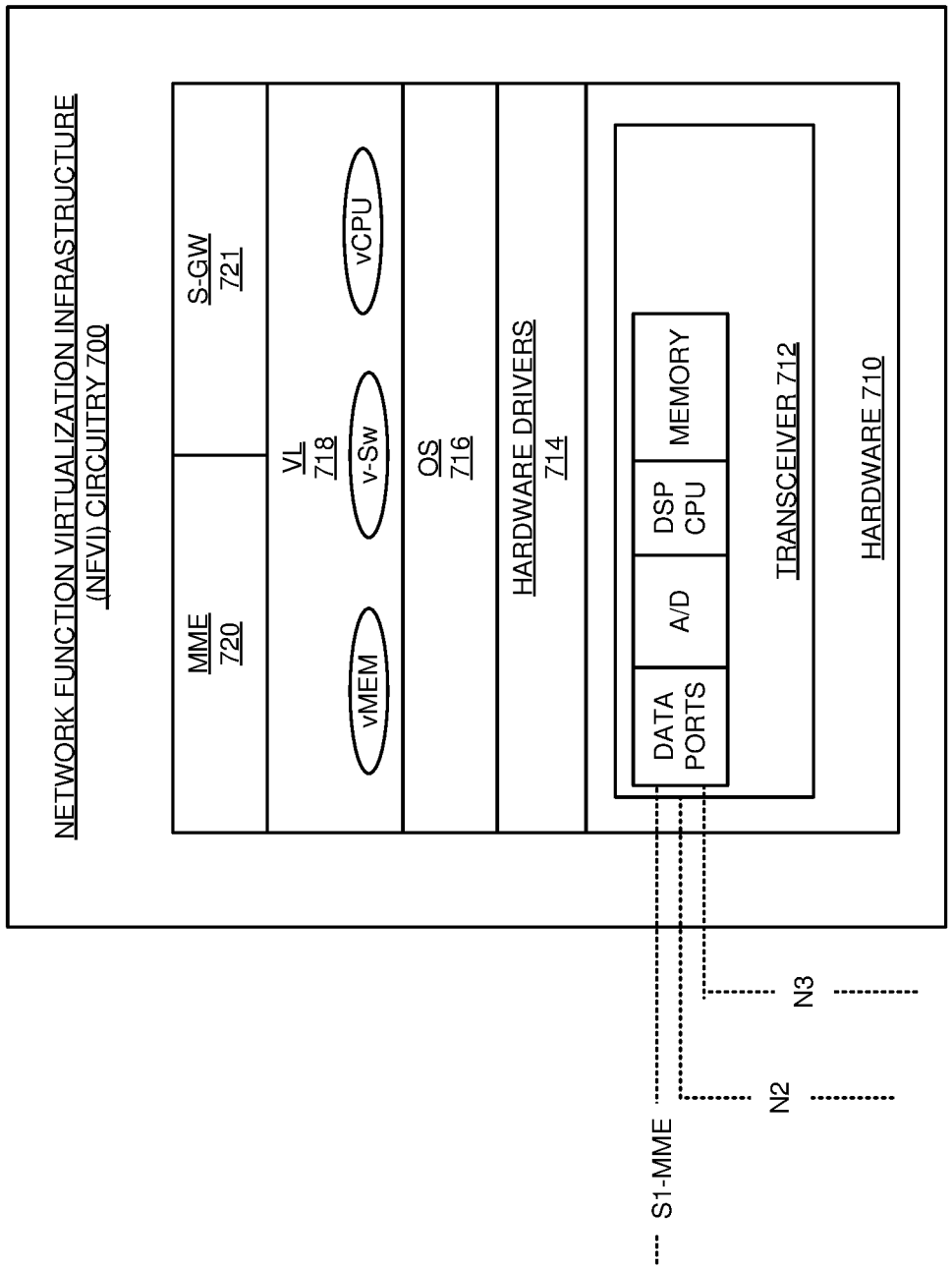
FIG. 7 illustrates an LTE/5G network core to serve 5GNR/LTE UEs over a master LTE eNodeB and the secondary 5GNR gNodeB.

FIG. 7 illustrates Network Function Virtualization Infrastructure (NFVI) circuitry 700 to serve 5GNR/LTE UEs 401-402 over master LTE eNodeB 420 and secondary 5GNR gNodeB 421. NFVI 700 is an example of network controller 130, MME 430, data network element 140, and S-GW 440, although network controller 130, MME 430, data network element 140, and S-GW 440 may differ. NFVI circuitry 700 comprises hardware 710, transceiver circuitry 712, hardware drives 714, operating system 716, and virtual layers 718. Virtual layers 718 comprises virtual memory, virtual switches, and virtual Central Processing Units (CPUs) to execute MME VNF 720 and S-GW VNF 721. Hardware 710 comprises volatile and non-volatile memories like flash, disc, tape, and the like. Operating system 716, virtual layers 718, and VNFs 720-721 are stored by memory circuitry. Operating system 716, virtual layers 718, and VNFs 720-721 are executed by processing circuitry. Transceiver circuitry 712 comprises memory, DSP, CPU, analog-to-digital interface, and data ports. The data ports in transceiver circuitry 712 communicate LTE/5GNR attachment messages with master LTE eNodeB 420 and secondary 5GNR gNodeB 421 over S1-MME links.

The processing circuitry executes operating systems 716 to drive hardware 710 and support virtual layers 718. The processing circuitry executes virtual layers 718 to support the network element applications. The virtual layers comprise virtual switches, virtual machines, hypervisors, and the like. In transceiver circuitry 712, the DSP/CPUs exchange data and signaling with the transceiver memory. The processing circuitry exchanges the data and signaling between the transceiver memory and memory circuitry. The processing circuitry executes VNFs 720-721 to process the data and signaling in memory circuitry.

Once LTE/5GNR UEs 401-402 attach, LTE/5GNR access points 420-421 transfer attachment messages that indicate a 5GNR or non-5GNR attachment to MME VNF 720 over S1-MME signaling. In response, MME VNF 720 transfers network signaling indicating the attachment type to S-GW VNF 721, such as S-GW 440. S-GW VNF 721 then transfers user data for the other UE responsive to network signaling using over 51-U signaling. S-GW VNF 721 also monitors quality-of-service for the transfer of the other user data responsive to the attachment indication in the network signaling. S-GW VNF 721 may further determine that the quality-of service for the other UE exceeds a bearer switch threshold and in response, transfer an instruction to the wireless base station to handover the UE from the 5GNR access point to the non-5GNR access point.

Figure 8:
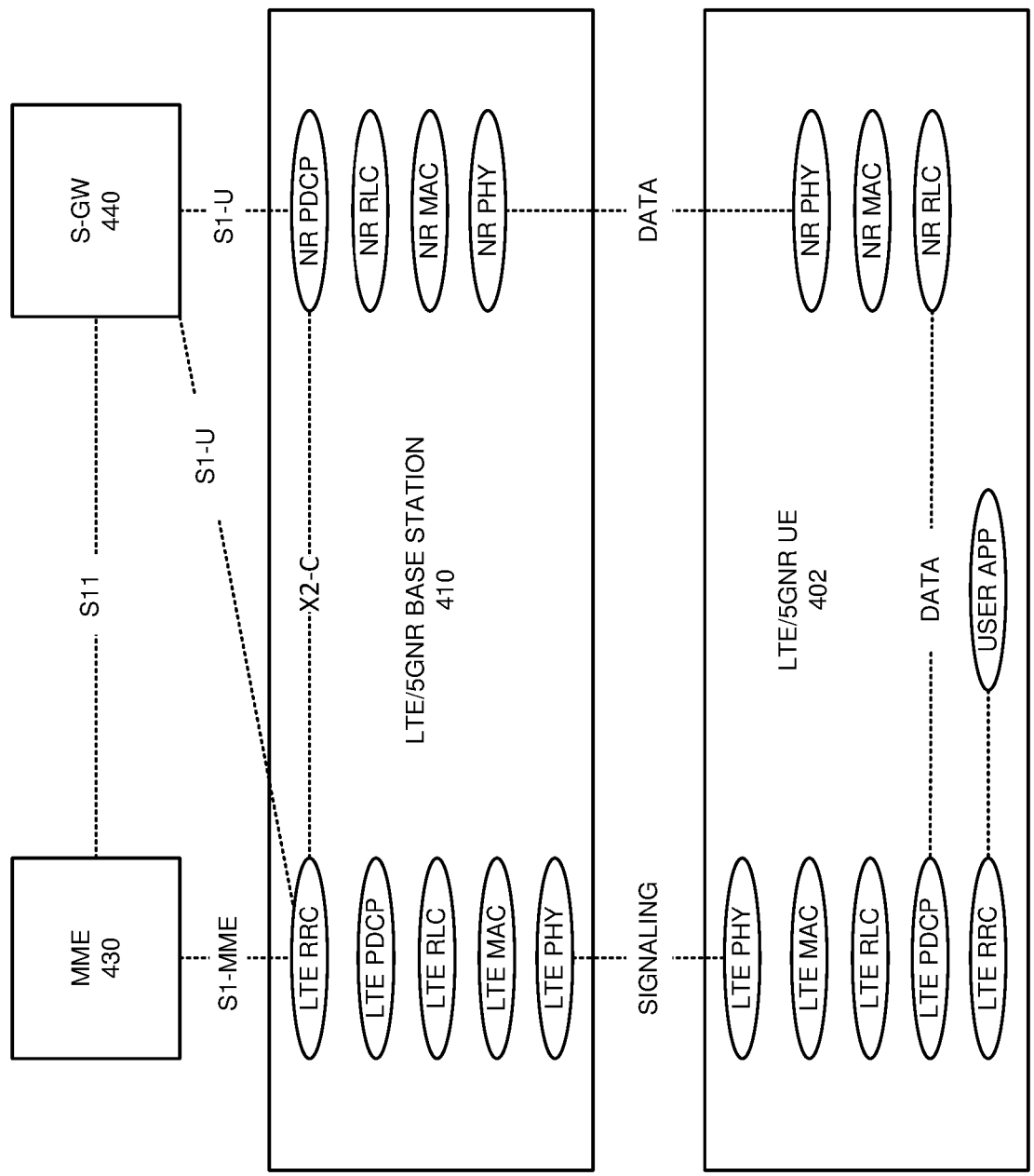
FIG. 8 illustrates an operation of the LTE/5G communication system to serve the LTE/5GNR UEs over the master LTE eNodeB and the secondary 5GNR gNodeB.

FIG. 8 illustrates an operation of LTE/5G communication system 400 to serve LTE/5GNR UEs 401-402 over LTE/5GNR base station 410. The LTE RRC in LTE/5GNR UE 402 attaches to the LTE RRC in LTE/5GNR base station 410 over the LTE PDCP, LTE RLC, LTE MAC, and the LTE PHY. The LTE RRC in LTE/5GNR base station 410 transfers an LTE attachment message for LTE/5GNR UE 402 to MME 430 over the S1-MME link. MME 430 transfers a create bearer request to S-GW 440 over S11 links. S-GW 440 transfers user data for LTE/5GNR UE 402 to the LTE RRC in LTE/5GNR base station 410 over an S1-U link responsive to the network signaling. The LTE RRC in LTE/5GNR base station 410 then exchanges user data with the LTE RRC in LTE/5GNR UE 402 over the LTE PHYs, LTE MACs, LTE RLCs, and LTE PDCPs, in LTE/5GNR base station 410 and LTE/5GNR UE 402.

In a next operation, the LTE RRC in the LTE/5GNR UE 402 wirelessly attaches to the LTE RRC in LTE/5GNR base station 410 over the New Radio (NR) PHY, MAC, and RLC in LTE/5GNR UE 402 and the LTE RRC, PDCP, RLC, MAC, and PHY in LTE/5GNR base station 410. The LTE RRC in LTE/5GNR base station 410 transfers an attachment message to MME 430 over the S1-MME links responsive to LTE/5GNR UE 402 wirelessly attaching to LTE/5GNR base station 410.

MME 430 transfers a modify bearer request over the S11 links indicating the 5GNR attachment for LTE/5GNR UE 402 to S-GW 440 responsive to the other attachment message indicating the 5GNR attachment. S-GW 440 transfers other user data for LTE/5GNR UE 402 with LTE/5GNR base station 410 over an S1-U link responsive to the other network signaling. LTE/5GNR base station 410 then exchanges the other user data with LTE/5GNR UE 402 over the NR PDCPs, NR RLCs, NR MACs, and NR PHYs in LTE/5GNR base station 410 and LTE/5GNR UE 402. The NR RLC in LTE/5GNR UE 402 then exchanges the other data with the user application over the LTE PDCP and LTE RRC in LTE/5GNR UE 402.

S-GW 440 also monitors the latency statistics for the transfer of the other user data responsive to the 5GNR attachment indication in the other network signaling. S-GW 440 may perform a GTPU Echo test to examine the latency statistics for LTE/5GNR UE 402 and determine that the latency statistics exceed a bearer switch threshold. In response, S-GW 440 transfers an instruction in a modify bearer response to LTE/5GNR base station 410 to handover LTE/5GNR UE 402 from the 5GNR access point to the LTE access point.

The wireless data network circuitry described above comprises computer hardware and software that form special-purpose network elements that serve users with more efficient user message delivery. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network elements that serve users with more efficient user message delivery.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication system comprising a wireless base station that has a Fifth Generation New Radio (5GNR) access point and a non-5GNR access point, the method comprising:
   the wireless base station transferring an attachment message for a User Equipment (UE) to a network controller responsive to the UE wirelessly attaching to the non-5GNR access point;
   the network controller transferring network signaling for the UE to a data network element responsive to the attachment message;
   the data network element transferring user data for the UE responsive to the network signaling;
   the wireless base station transferring another attachment message that indicates a 5GNR attachment for another UE to the network controller responsive to the other UE wirelessly attaching to the 5GNR access point;
   the network controller transferring other network signaling indicating the 5GNR attachment for the other UE to the data network element responsive to the other attachment message indicating the 5GNR attachment; and
   the data network element transferring other user data for the other UE responsive to the other network signaling and monitoring quality-of-service for the transfer of the other user data responsive to the 5GNR attachment indication in the other network signaling; and
   the data network element determining that the quality-of-service for the other UE exceeds a bearer switch threshold and in response, transferring an instruction to the wireless base station to handover the other UE from the 5GNR access point to the non-5GNR access point.

2. The method of claim 1 wherein the data network element monitoring the quality-of-service for the transfer of the other user data responsive to the 5GNR attachment indication in the other network signaling comprises the data network element performing a periodic General Packet Radio Service (GPRS) Tunneling Protocol User Plane (GTPU) Echo test to determine the transfer of the other user data responsive to the 5GNR attachment indication in the other network signaling.

3. The method of claim 1 wherein the wireless base station transferring the attachment message for the UE to the network controller responsive to the UE attachment comprises the wireless base station transferring a node type parameter over at least one of an S1-MME signaling link and an N2 signaling link to the network controller responsive to the UE attachment.

4. The method of claim 1 wherein the wireless base station transferring the attachment message for the UE to the network controller responsive to the UE attachment comprises the wireless base station transferring a node type parameter in an Evolved Packet Switched System (EPS) Radio Access Bearer (E-RAB) Modification Indication to the network controller responsive to the UE attachment.

5. The method of claim 1 wherein the network controller transferring the network signaling for the UE to the data network element responsive to the attachment message comprises the network controller transferring a node type parameter in a modify bearer request message to the data network element responsive to the attachment message.

6. The method of claim 1 wherein the network controller comprises a Mobility Management Entity (MME).

7. The method of claim 1 wherein the network controller comprises an Access and Mobility Management Function (AMF).

8. The method of claim 1 wherein the data network element comprises a Serving Gateway (S-GW).

9. The method of claim 1 wherein the data network element comprises a User Plane Function (UPF).

10. A wireless communication system comprising a wireless base station that has a Fifth Generation New Radio (5GNR) access point and a non-5GNR access point, the wireless communication system comprising:

the wireless base station configured to transfer an attachment message for a User Equipment (UE) to a network controller responsive to the UE wirelessly attaching to the non-5GNR access point;

the network controller configured to transfer network signaling for the UE to a data network element responsive to the attachment message;

the data network element configured to transfer user data for the UE responsive to the network signaling;

the wireless base station configured to transfer another attachment message that indicates a 5GNR attachment for another UE to the network controller responsive to the other UE wirelessly attaching to the 5GNR access point;

the network controller configured to transfer other network signaling indicating the 5GNR attachment for the other UE to the data network element responsive to the other attachment message indicating the 5GNR attachment; and the data network element configured to transfer other user data for the other UE responsive to the other network signaling and monitor quality-of-service for the transfer of the other user data responsive to the 5GNR attachment indication in the other network signaling; and the data network element configured to determine that the quality-of service for the other UE exceeds a bearer switch threshold and in response, transfer an instruction to the wireless base station to handover the other UE from the 5GNR access point to the non-5GNR access point.

11. The wireless communication system of claim 10 wherein the data network element configured to monitor the quality-of-service for the transfer of the other user data responsive to the 5GNR attachment indication in the other network signaling comprises the data network element configured to perform a periodic General Packet Radio Service (GPRS) Tunneling Protocol User Plane (GTPU) Echo test to determine the transfer of the other user data responsive to the 5GNR attachment indication in the other network signaling.

12. The wireless communication system of claim 10 wherein the wireless base station configured to transfer the attachment message for the UE to the network controller responsive to the UE attachment comprises the wireless base station configured to transfer a node type parameter over at least one of an S1-MME signaling link and an N2 signaling link to the network controller responsive to the UE attachment.

13. The wireless communication system of claim 10 wherein the wireless base station configured to transfer the attachment message for the UE to the network controller responsive to the UE attachment comprises the wireless base station configured to transfer a node type parameter in an Evolved Packet Switched System (EPS) Radio Access Bearer (E-RAB) Modification Indication to the network controller responsive to the UE attachment.

14. The wireless communication system of claim 10 wherein the network controller configured to transfer the network signaling for the UE to the data network element responsive to the attachment message comprises the network controller configured to transfer a node type parameter in a modify bearer request message to the data network element responsive to the attachment message.

15. The wireless communication system of claim 10 wherein the network controller comprises a Mobility Management Entity (MME).

16. The wireless communication system of claim 10 wherein the network controller comprises an Access and Mobility Management Function (AMF).

17. The wireless communication system of claim 10 wherein the data network element comprises a Serving Gateway (S-GW).

18. The wireless communication system of claim 10 wherein the data network element comprises a User Plane Function (UPF).

* * * * *